United States Patent
Lee et al.

(10) Patent No.: US 10,481,759 B2
(45) Date of Patent: Nov. 19, 2019

(54) BENDED DISPLAY DEVICE FOR CONTROLLING FUNCTION OF APPLICATION THROUGH IMAGE DISPLAYED ON SUB-REGION, AND CONTROL METHOD THEREFOR

(71) Applicant: LG ELECTRONICS INC., Seoul (KR)

(72) Inventors: Doyoung Lee, Seoul (KR); Juhwan Lee, Seoul (KR); Sinae Chun, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 153 days.

(21) Appl. No.: 15/540,536

(22) PCT Filed: Dec. 29, 2014

(86) PCT No.: PCT/KR2014/012979
§ 371 (c)(1),
(2) Date: Jun. 28, 2017

(87) PCT Pub. No.: WO2016/108298
PCT Pub. Date: Jul. 7, 2016

(65) Prior Publication Data
US 2018/0024722 A1    Jan. 25, 2018

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 1/1652* (2013.01); *G06F 3/0486* (2013.01);
(Continued)

(58) Field of Classification Search
CPC .... G06F 3/04817; G06F 3/048; G06F 1/1652; G06F 3/04883; G06F 9/44; G06F 9/451;
(Continued)

(56) References Cited

U.S. PATENT DOCUMENTS 8,271,047 B2 *   9/2012   Kim .................. G06F 1/1615
                                                345/156
9,372,561 B2 *   6/2016   Kim .................. G06F 3/041
(Continued)

FOREIGN PATENT DOCUMENTS

KR    1020130127050    11/2013
KR    1020140054746     5/2014
(Continued)

OTHER PUBLICATIONS

PCT International Application No. PCT/KR2014/012979, Written Opinion of the International Searching Authority dated Aug. 21, 2015, 24 pages.

*Primary Examiner* — Shen Shiau
(74) *Attorney, Agent, or Firm* — Lee, Hong, Degerman, Kang & Waimey

(57) ABSTRACT

A bended display device according to the present specification comprises: a bended display which has a main region toward the front side of the device and a sub-region extending from the main region and having a predetermined curvature, and is capable of receiving input through a user's contact; and a control unit for controlling a function of the device, wherein the control unit can control so that when a user's first input for an icon of the application displayed on the sub-region is received through the bended display, the icon is transformed into a preset form of an image and is displayed on the sub-region, and when a user's second input for the image is received through the bended display, a
(Continued)

function corresponding to the second input among the functions of the application can be performed.

11 Claims, 11 Drawing Sheets

(51) Int. Cl.
  *G06F 9/44* (2018.01)
  *G06F 1/16* (2006.01)
  *G06F 3/0486* (2013.01)
  *G06F 3/0488* (2013.01)
  *G06F 9/451* (2018.01)
  *G06F 3/0482* (2013.01)

(52) U.S. Cl.
  CPC .............. *G06F 3/0488* (2013.01); *G06F 9/44* (2013.01); *G06F 9/451* (2018.02); *G06F 1/1626* (2013.01); *G06F 3/048* (2013.01); *G06F 3/0482* (2013.01); *G06F 3/04883* (2013.01); *G06F 2203/04803* (2013.01)

(58) Field of Classification Search
  CPC ......... G06F 3/0482; G06F 2203/04803; G06F 3/0488; G06F 1/1626
  See application file for complete search history.

(56) References Cited

U.S. PATENT DOCUMENTS

| | | | | |
|---|---|---|---|---|
| 9,830,075 | B2 * | 11/2017 | Kim | G06F 3/04817 |
| 10,069,771 | B2 * | 9/2018 | Lee | G06F 3/04817 |
| 2010/0333027 | A1 * | 12/2010 | Martensson | G06F 3/04883 |
| | | | | 715/833 |
| 2013/0076649 | A1 * | 3/2013 | Myers | H04M 1/0268 |
| | | | | 345/173 |
| 2013/0300697 | A1 * | 11/2013 | Kim | G06F 1/1626 |
| | | | | 345/173 |
| 2014/0189597 | A1 * | 7/2014 | Kang | G06F 3/04817 |
| | | | | 715/835 |
| 2014/0237420 | A1 * | 8/2014 | Song | G06F 3/04845 |
| | | | | 715/790 |
| 2015/0015511 | A1 * | 1/2015 | Kwak | G06F 3/0412 |
| | | | | 345/173 |
| 2015/0248200 | A1 * | 9/2015 | Cho | G06F 3/0482 |
| | | | | 715/773 |
| 2015/0261376 | A1 * | 9/2015 | Kim | G06F 3/0487 |
| | | | | 345/173 |
| 2015/0324569 | A1 * | 11/2015 | Hong | G06F 21/32 |
| | | | | 345/174 |
| 2015/0339804 | A1 * | 11/2015 | Kim | G06F 3/04886 |
| | | | | 345/659 |
| 2015/0346899 | A1 * | 12/2015 | Jung | G06F 3/0416 |
| | | | | 345/173 |
| 2015/0378592 | A1 * | 12/2015 | Kim | G06F 1/1626 |
| | | | | 715/765 |
| 2016/0048316 | A1 * | 2/2016 | Bae | G06F 1/1626 |
| | | | | 715/800 |
| 2016/0062515 | A1 * | 3/2016 | Bae | G06F 3/04 |
| | | | | 345/174 |
| 2016/0062556 | A1 * | 3/2016 | Chung | G06F 3/0481 |
| | | | | 715/781 |
| 2016/0062600 | A1 * | 3/2016 | Kim | G06F 3/04817 |
| | | | | 715/765 |
| 2016/0085405 | A1 * | 3/2016 | Lee | G06F 3/0412 |
| | | | | 345/173 |
| 2016/0127652 | A1 * | 5/2016 | Park | G06F 3/0483 |
| | | | | 715/835 |
| 2016/0132074 | A1 * | 5/2016 | Kim | G06F 1/1652 |
| | | | | 715/769 |
| 2016/0132236 | A1 * | 5/2016 | Sun | G06F 3/04886 |
| | | | | 715/773 |
| 2016/0188197 | A1 * | 6/2016 | Ryu | G06F 3/04883 |
| | | | | 345/156 |
| 2016/0313966 | A1 * | 10/2016 | Jeong | G06F 1/1626 |

FOREIGN PATENT DOCUMENTS

| | | |
|---|---|---|
| KR | 1020140086820 | 7/2014 |
| KR | 1020140112756 | 9/2014 |
| KR | 1020140120470 | 10/2014 |

* cited by examiner

BENDED DISPLAY DEVICE FOR CONTROLLING FUNCTION OF APPLICATION THROUGH IMAGE DISPLAYED ON SUB-REGION, AND CONTROL METHOD THEREFOR

CROSS-REFERENCE TO RELATED APPLICATIONS

This application is the National Stage filing under 35 U.S.C. 371 of International Application No. PCT/KR2014/012979, filed on Dec. 29, 2014, the contents of which are all hereby incorporated by reference herein in its entirety.

TECHNICAL FIELD

The present specification relates to a bended display device having a main region facing the front side of the device and a sub-region of a prescribed curvature extended from the main region and a method of controlling therefor, and more particularly, to a bended display device controlling a function of an application via an image displayed on a sub-region and a method of controlling therefor.

BACKGROUND ART

Various electronic devices are used in our daily life with the help of the development of a semiconductor technology and a communication technology. Among the various electronic devices, a display device capable of watching and listening multimedia is most widely used.

Recently, a foldable display to which flexibility is provided by replacing a glass plate around liquid crystal of an LCD (liquid crystal display), an LED (light emitting diode), an OLED (organic LED), and an AMOLED (active matrix OLED) with a plastic film receives attention as a display used for a device. The display is divided into a bended display capable of maintaining a bended shape in a manner of being connected to a main body of a device and a flexible display capable of being freely folded and unfolded.

When the bended display is connected to the main body of the device, the bended display may have a main region facing the front side of the device and a sub-region having a prescribed curvature in a manner of being extended from the main region. A function of the device can be displayed and managed by linking information on the main region with information on the sub-region. In particular, the sub-region of the bended display can be used as a function region and a display region. For example, various informations such as event information corresponding to an application of the main region, attachment information, status information, control information, and the like can be provided via the sub-region. If it is necessary to control a screen of the main region, it is able to control a function on the screen by controlling the sub-region.

Meanwhile, in order for a general device to execute a specific function of a specific application, several steps are required. First of all, an icon of the application is selected, the application is executed, and a specific function is selected from the application according to an input interface. In this case, when a user intends to use a frequently used function or a specific function quickly, the steps may become a quite cumbersome procedure. Hence, it is necessary to provide more convenient environment to the user by managing a device function supported by the sub-region and utilizing a function capable of being displayed.

DISCLOSURE OF THE INVENTION

Technical Task

The present specification is designed by recognizing the aforementioned related art. An object of the present specification is to provide a bended display device capable of providing a user convenience to a user by displaying a GUI capable of immediately executing a specific function in an application on a sub-region having a prescribed curvature in a manner of being extended from a main region facing the front side of the device and a method of controlling therefor.

Technical Solution

To achieve these and other advantages and in accordance with the purpose of the present invention, as embodied and broadly described, according to one embodiment, a bended display device includes a bended display including a main region facing the front side of the device and a sub-region having a prescribed curvature in a manner of being extended from the main region, the bended display capable of receiving an input inputted via a contact of a user, and a control unit configured to control a function of the device, the control unit, if a first input of the user is received on an icon of an application displayed on the sub-region via the bended display, configured to transform the icon into an image of a predetermined form and display the image on the sub-region, the control unit, if a second input is received on the image via the bended display, configured to control a function corresponding to the second input among functions of the application to be performed.

According to one embodiment of the present specification, if a touch input of the user is received on the icon of the application displayed on the sub-region, the control unit can execute the application or control the executed application to be displayed on the main region.

According to one embodiment of the present specification, the first input may correspond to an input for moving the icon of the application in a direction away from the main region in a state that the user maintains a contact on the icon of the application.

According to one embodiment of the present specification, the image may correspond to an image of a switch form. In this case, the image of the switch form may have a push button switch form, a tact switch form, a toggle switch form, or a slide switch form.

According to one embodiment of the present specification, the image may have a size smaller than the icon of the application.

According to one embodiment of the present specification, the image can be displayed on a position corresponding to the side of the device among the sub-region.

According to one embodiment of the present specification, the image can include an identifier capable of identifying the application.

According to one embodiment of the present specification, the second input may correspond to at least one selected from the group consisting of a touch input, a double touch input, and an input for maintaining a touch for prescribed time.

According to one embodiment of the present specification, the control unit can display an interface capable of configuring a function of the application corresponding to the second input on the main region.

According to one embodiment of the present specification, if a function of an application corresponding to the image is operating, the control unit can display a graphic effect on the image to indicate that the application is in an active state. In this case, the graphic effect may correspond to a graphic effect related to the function corresponding to the second input.

According to one embodiment of the present specification, if the function corresponding to the second input is performed, the control unit may not display a screen of the application on the main region.

According to one embodiment of the present specification, if a third input of the user is received on the button image via the bended display, the control unit can retransform the image into the icon of the application and display the icon on the sub-region. In this case, the third input may correspond to an input for moving the button image in a direction adjacent to the main region in a state that the user maintains a contact on the button image.

To further achieve these and other advantages and in accordance with the purpose of the present invention, according to a different embodiment, a method of controlling a bended display device, which includes a bended display including a main region facing the front side of the device and a sub-region having a prescribed curvature in a manner of being extended from the main region, the bended display capable of receiving an input inputted via a contact of a user, includes the steps of, (a) if a first input of the user is received on an icon of an application displayed on the sub-region via the bended display, transforming the icon into an image of a predetermined form and displaying the image on the sub-region, and (b) if a second input is received on the image via the bended display, controlling a function corresponding to the second input among functions of the application to be performed.

Advantageous Effects

According to one embodiment of the present specification, it is able to quickly execute a specific function of an application. Moreover, since it is able to convert an icon of an application into an image for performing a specific function, a user can immediately identify the function of the application.

According to a different embodiment of the present specification, since a screen of an application is not displayed on a main region while a specific function of the application is performed, it may be able to quickly use the specific function of the application while using a different application.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Reference will now be made in detail to the preferred embodiments of the present invention, examples of which are illustrated in the accompanying drawings. While embodiments are concretely described with reference to the attached diagrams and the contents written on the diagrams, the present specification may be non-restricted or non-limited to the embodiments.

An object of a bended display device according to the present specification is to increase user convenience by displaying a GUI capable of immediately executing a specific function in an application on a sub-region of a bended display. To this end, a legacy icon for executing an application is transformed to generate a GUI (i.e., shortcut button) capable of executing a specific function.

Figure 1:
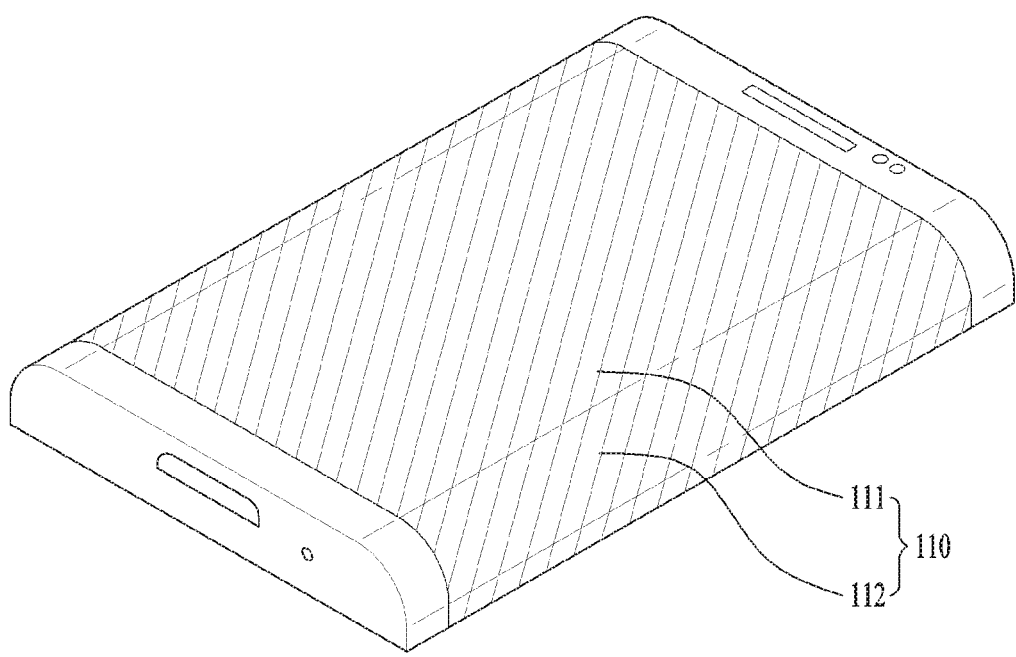
FIG. 1 is a perspective diagram for a bended display device according to one embodiment of the present specification.

FIG. 1 is a perspective diagram for a bended display device according to one embodiment of the present specification.

Referring to FIG. 1, it is able to check a bended display 110 included in a device 100 according to the present specification. The bended display 110 includes a main region 111 facing the front side of the device 100 and a sub-region 112 having a prescribed curvature in a manner of being extended from the main region 111.

In the embodiment shown in FIG. 1, although the sub-region 112 is positioned at both sides of the device on the basis of the front side of the device 100 for example, the bended display 110 according to the present specification can be implemented in various shapes. For example, the sub-region 112 can be positioned at one side among the left side, the upper side, and the lower side. The bended display 110 may have the sub-region 112 positioned at least two positions selected from the group consisting of the right side, the left side, the upper side, and the lower side.

Since the bended display 110 uses a plastic board rather than a generally used glass plate, the bended display can be formed using a processor manufactured in low temperature instead of a legacy processor to prevent damage of the board. The bended display 110 provides flexibility capable of being folded and unfolded by replacing a glass plate around liquid crystal of an LCD (liquid crystal display), an LED (light emitting diode), an OLED (organic LED), and an AMOLED (active matrix OLED) with a plastic film. The bended display 110 is thin, light, and shock-resistant. Moreover, as mentioned in the foregoing description, since the bended display is bendable and foldable, it may be able to manufacture the bended display in various shapes.

The bended display 110 may have an active matrix screen of a specific screen size (e.g., 3 inches, 4 inches, 4.65 inches, 4.8 inches, 5 inches, 6.5 inches, 7.7 inches, 8.9 inches, 10.1 inches, etc.) depending on a size of the device 100. The sub-region 112 can be connected with the device 100 in a manner that the curvature of the sub-region 112 is folded with a radius of curvature equal to or less than a radius of curvature (e.g., radius of curvature 5 cm, 1 cm, 7.5 mm, 5 mm, 4 mm, etc.) in which the bended display 110 is operable.

And, the bended display 110 can receive an input inputted via a contact of a user. To this end, the bended display 110 can include a touch sensor. The touch sensor may correspond to a resistive type sensor and a capacitive type sensor. A sensor capable of sensing a contact of a user and outputting a signal can be included in the touch sensor.

Figure 2:
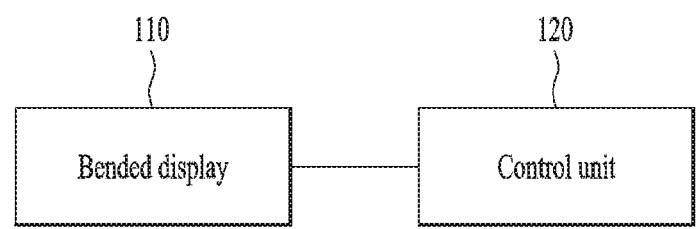
FIG. 2 is a schematic block diagram for configurations of a bended display device according to the present specification.

FIG. 2 is a schematic block diagram for configurations of a bended display device according to the present specification.

Referring to FIG. 2, a device 100 according to the present specification includes a bended display 110 and a control unit 120.

Since the bended display 110 has already been explained with reference to FIG. 1, explanation on the bended display is omitted at this time.

The control unit 120 can control a function of the device 100. In particular, the control unit 120 can control a specific application to be executed according to a user input received via the bended display 110 or controls a function of an application to be performed.

Figure 3:
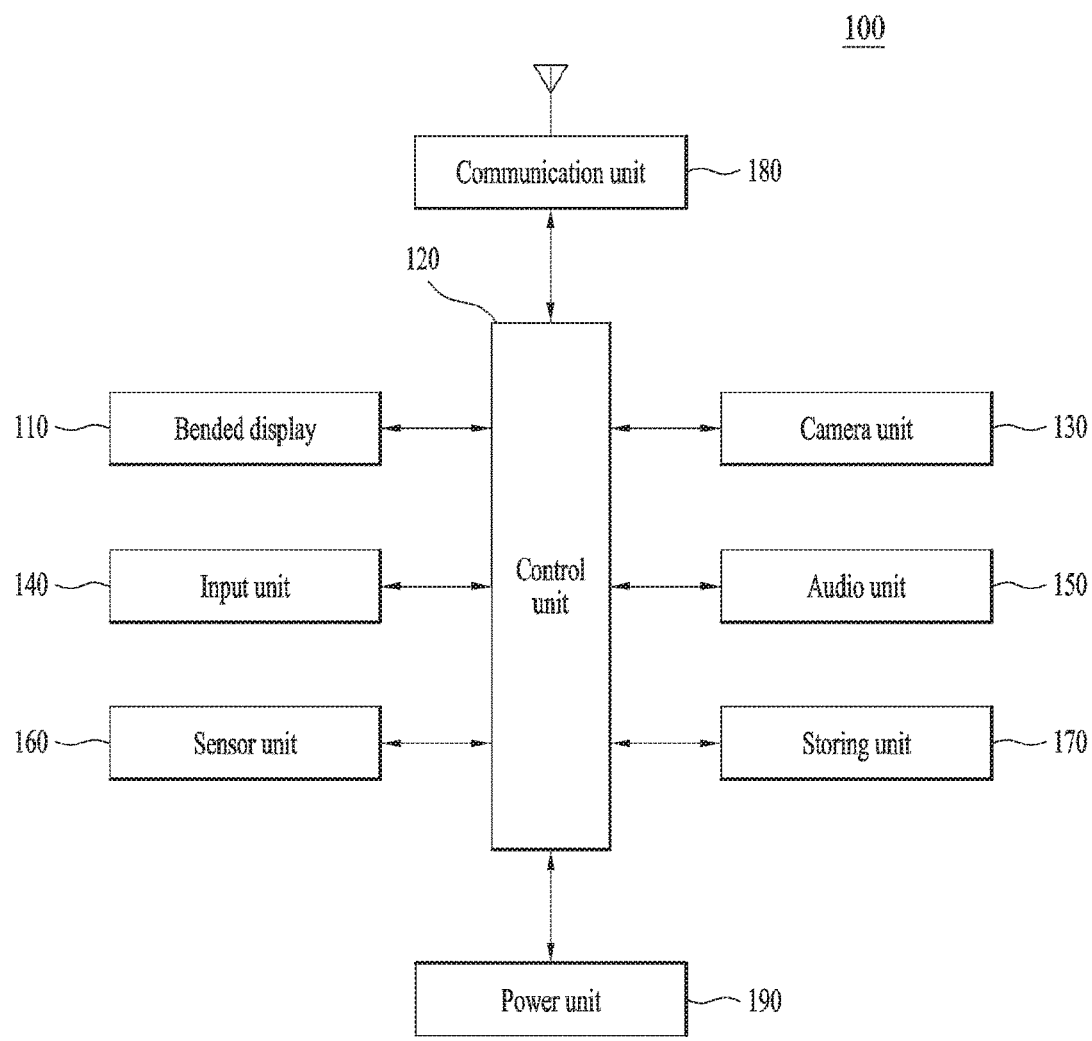
FIG. 3 is a schematic block diagram for configurations capable of being further included in a bended display device 100 according to embodiment of the present specification.

FIG. 3 is a schematic block diagram for configurations capable of being further included in a bended display device 100 according to the present specification.

Referring to FIG. 3, a device 100 according to the present specification can further include at least one selected from the group consisting of a camera unit 130, an input unit 140, an audio unit 150, a sensor unit 160, a storing unit 170, a communication unit 180, and a power unit 190 as well as the bended display 110 and the control unit 120.

In the present specification, a bended display device 100 includes the bended display 110 and corresponds to a device of various types capable of processing digital data and performing an operation corresponding to the digital data. As the performance of the device is enhanced, it may be able to execute various contents via the device. For example, the device can include a TV, a laptop computer, a desktop computer, a monitor, a smartphone, a tablet PC, a navigator, a PMP, a terminal for payment, a terminal for security, a kiosk, and the like. In particular, a widely used portable device is utilized as a player of comprehensive multimedia contents.

The camera unit 130 captures a surrounding image of the digital device 100 and converts the image into an electrical signal. To this end, the camera unit 130 can include an image sensor. The image sensor can convert an optical signal into an electrical signal. After the image is captured by the camera unit 130 and is converted into the electrical signal, the image is stored in the storage unit 170 and can be outputted to the control unit 120. Or, the image can be outputted to the control unit 120 without being stored in the storage unit. The image captured by the camera unit 130 may correspond to a still image or a video. The camera unit 130 can also be used as a motion sensor or a video sensor. If necessary, the camera unit 130 can include a plurality of cameras.

The input unit 140 can receive a user command from the external. The input unit 140 can be implemented in various ways. For example, the input unit 140 can be implemented by a keyboard, a keypad, a mouse, a touch pad, a button, a soft key, and the like. In a broad sense, the input unit 140 can include a microphone, a touch screen, and the like. The microphone can receive a voice input of a user and the touch screen can receive a touch gesture of the user. In some cases, the microphone can be included in the audio unit 150. Meanwhile, since the bended display 110 is able to receive an input inputted by a contact of a user, the bended display may correspond to the input unit 140.

The audio unit 150 can include an audio output means such as a speaker and the like and an audio input means such as a microphone and the like. The audio output means can output an audio signal of contents executed in the digital device 100. The contents can be received from the storing unit 170 or can be received from the external digital device 100 via the communication unit 180. The audio output means can include at least one of an air conduction speaker and a bone conduction speaker.

The sensor unit 160 detects surrounding environment of the digital device 100 using at least one sensor mounted on the digital device 100 and can forward the detected information to the control unit 120. And, the sensor unit 160 senses a user input and can forward the user input to the control unit 120. In this case, the sensor unit 160 can include at least one sensing means. For example, the sensing means can include various sensing means including an infrared sensor, an inclination sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a fingerprint sensor, and the like. The sensor unit 160 is a common name for the aforementioned various sensing means. The sensor unit senses various inputs of a user and environment of the user and forwards a sensed result to the control unit 120 to make the control unit perform an operation according to the sensed result. The sensing means can be included in the digital device 100 as a separate element or can be included in the digital device in a manner of being integrated using at least one or more elements. Meanwhile, since the bended display 110 is able to receive an input inputted by a contact of a user, the bended display may correspond to the sensor unit 160.

The storing unit 170 can store various digital data including a video, an audio, a picture, an application, and the like. The application may correspond to a program for operating the control unit 120. And, the video or the picture may correspond to data captured by the camera unit 130. The storing unit 170 can be configured through a RAM (Random Access Memory), an SRAM (Static Random Access Memory), a ROM (Read Only Memory), an EEPROM (Electrically Erasable Programmable Read Only Memory), a PROM (Programmable Read Only Memory), and the like. The storing unit 170 can perform the storing function in a manner of being associated with web storage on the Internet. The storing unit 170 can further include an external storing media capable of being removed from the digital device 100. The external storing media may have a slot form such as an SD (secure digital) or a CF (compact flash) memory, a memory stick form, a USB (universal serial bus) form, and the like. In particular, the external storing media can include all storing media capable of being removed from the digital device 100 and providing contents such as an audio, a picture, a video, an application, and the like to the digital device 100. For example, the storing unit 170 can include a RAM, a ROM, a cache memory, a HDD (hard disk drive), an SSD (solid state drive), a CD, a DVD, a Blu-ray disk, an FDD (floppy disc drive), a magnetic disk, a memory card, a flash memory, a USB memory, and the like.

The communication unit 180 performs communication with an external digital device using various protocols to transceive data with the external device.

The external digital device may correspond to a mobile terminal or a fixed terminal. Examples of the mobile terminal include a cellular phone, a smartphone, a tablet PC (personal computer), a smart pad, a notebook, a digital broadcasting terminal, a PDA (personal digital assistants), a PMP (portable multimedia player), digital camera, a navigation, and the like. Examples of the fixed terminal include a desktop, a DVD (digital video disc or digital versatile disc) player, a TV, and the like.

The various protocols include a wired and a wireless communication protocols. In case of performing wired communication, the communication unit 180 can include various input/output interfaces (not depicted) capable of performing data transmission communication with the external digital device. For example, the interface can include an interface considering data transmission according to USB (universal serial bus) standard, HDMI (high definition multimedia interface), DVI (digital visual interface), IEEE 1394 standard, or a similar standard associated with data transmission. In case of performing wireless communication, the communication unit 180 can include an RF electrical network considering wireless access to an external communication network such as the internet, LAN (local area network), WAN (wide area network), and the like. A wireless communication network accessed by the communication unit 180 can support such a mobile communication scheme as GSM (Global System for Mobile Communications), EDGE (Enhanced Data GSM Environment, CDMA (Code Division Multiple Access), W-CDMA (Wideband Code Division Multiple Access), TDMA (Time Division Multiple Access), Wibro, HSPA (High Speed Packet Access), HSDPA (High Speed Downlink Packet Access), LTE (Long Term Evolution), and the like and such a short range communication scheme as Bluetooth, RFID (Radio Frequency Identification), IrDA, (infrared Data Association), UWB (Ultra Wideband), ZigBee, WLAN (Wireless LAN)(Wi-Fi), and the like.

In this case, the wired/wireless interface schemes correspond to embodiments for helping understand the present specification. Since those skilled in the art can easily change an interface scheme for transmitting/receiving information, in the present specification, an interface scheme is not restricted to the aforementioned embodiments.

The power unit 190 corresponds to a power source connected to a battery or an external power source and can provide power to a device. The battery includes not only a primary batter but also a secondary battery. The secondary battery includes a rechargeable lithium-ion battery, a lithium polymer battery, a nickel-cadmium battery, a nickel-hybrid battery, a nickel-zinc battery, and the like.

The control unit 120 can display information on an event (hereinafter, event information), which occurs in the middle of executing an application for displaying a screen on the main region 111, on the sub-region 112. In particular, the control unit can display and manage the function of the device 100 using the sub-region 112. In this case, the event information displayed on the sub-region 112 may correspond to information related to the application for displaying the screen on the main region 111 or information irrespective of the application for displaying the screen on the main region 111. For example, the information related to the application for displaying the screen on the main region 111 may correspond to various informations such as pop-up information corresponding to the application, attachment information, status information, control information, and the like. If it is necessary to control the screen displayed on the main region 111, it may be able to control a function for the screen by operating the sub-region 112. On the contrary, for example, the information irrespective of the application for displaying the screen on the main region 111 may correspond to information for notifying data in response to message reception (e.g., SMS (short message service)/MMS (multimedia message service) based message reception), mail reception, information reception of a push service, notification reception of a social network service (SNS), and the like, or information for notifying status information (e.g., charging state of a battery, notification of data clipped by a user, indicator, etc.) of the device 100.

Besides the aforementioned roles, the control unit 120 can execute contents stored in the storing unit 170, contents received via data communication, or the like. The control unit 120 executes various applications and processes internal data of the digital device 100. The control unit 120 controls each of the configurations of the device 100 and controls data communication to be performed between configurations. In order to execute control logic to be explained in detail in the following, the control unit 120 can include a processor well known to a technical field to which the present invention belongs thereto, ASIC (application-specific integrated circuit), other chipset, a logical circuit, a register, a communication modem, a data processing device, and the like. When the control logic is implemented by software, the control unit 120 can be implemented by a set of program modules. In this case, the program modules are stored in the storing unit 170 and can be executed by the processor.

In the following, control logic of the control unit 120 according to the present specification is explained in more detail with reference to FIGS. 4 to 10.

Figure 4:
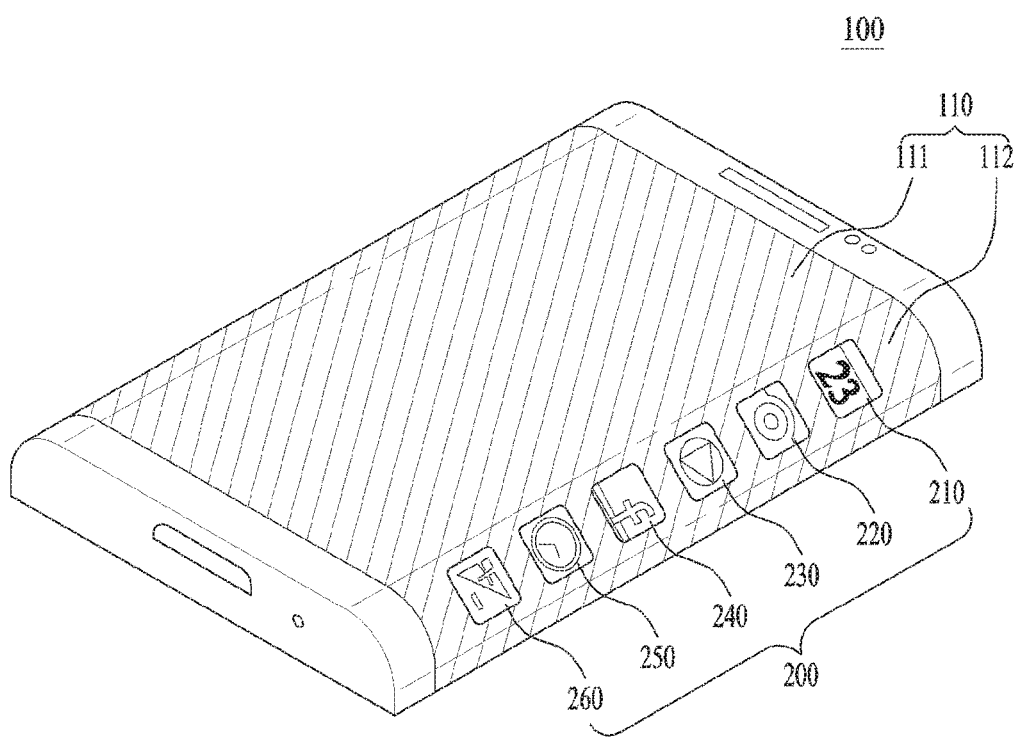
FIG. 4 is a diagram illustrating a display state of a bended display device according to the present specification.

FIG. 4 is a diagram illustrating a display state of a bended display device according to the present specification.

Referring to FIG. 4, it is able to see that icons 200 of applications are displayed on a sub-region 112 of the bended display. According to the embodiment of the present specification, when a touch input of a user is received on the icon 200 of an application displayed on the sub-region 112, the control unit 120 can control the application to be executed or control the executed application to be displayed on the main region 111.

In general, the icon 200 of the application is displayed on the main region 111. Yet, the icon 200 can also be displayed on the sub-region 112. The icon 200 can be moved to the sub-region 112 from the main region 111 using various schemes including a 'drag and drop' scheme. The number of icons 200 displayed on the sub-region 112 may vary depending on a size of the sub-region 112 and a size of the icons 200.

According to the present specification, when a first input of a user is received on an icon of an application displayed on the sub-region 112 via the bended display 110, the control unit 120 can display the icon on the sub-region 112 by transforming the icon into a predetermined form.

Figure 5:
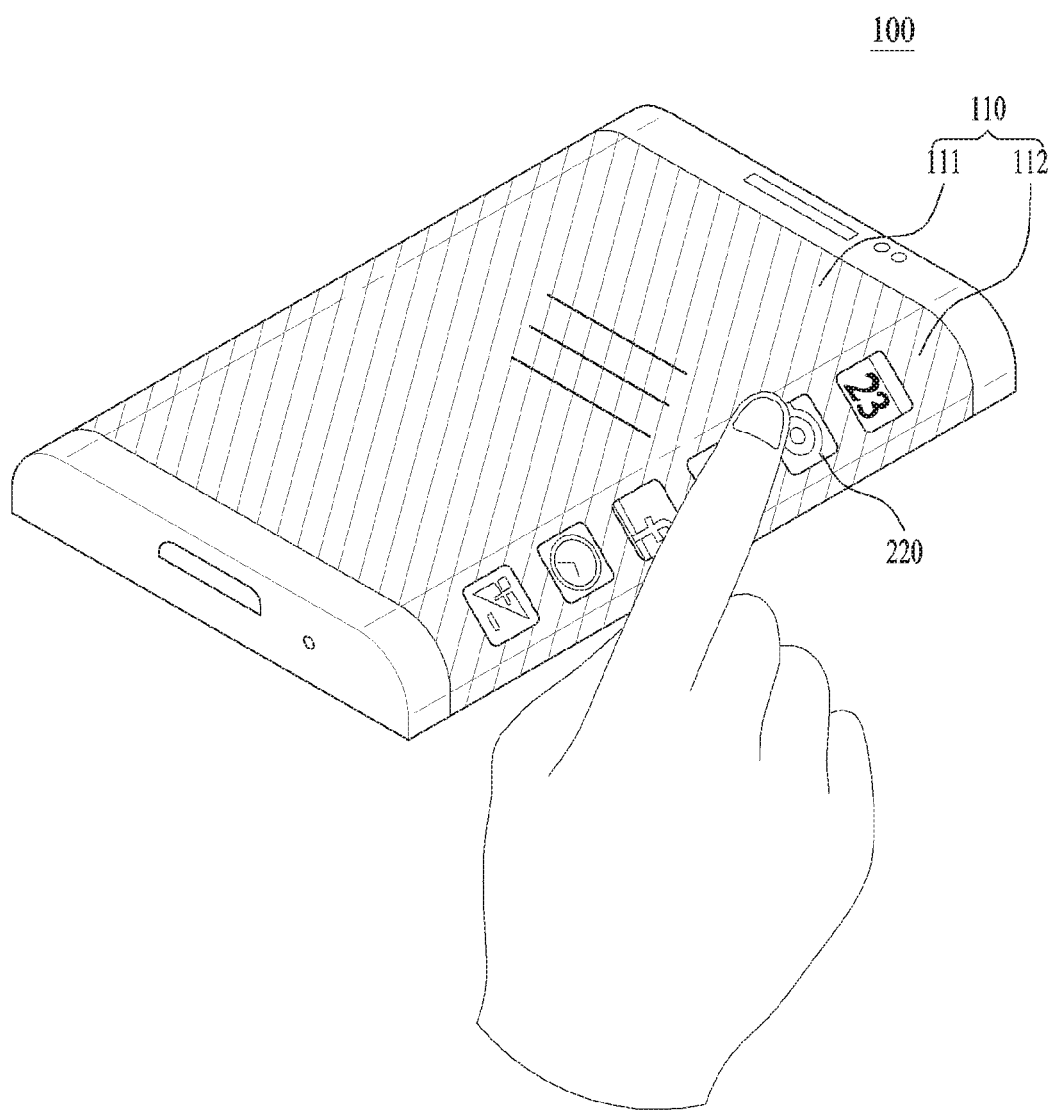
FIGS. 5 and 6 are diagrams illustrating a first input for transforming an icon to an image of a switch form and an image of a switch form according to one embodiment of the present specification.
Figure 6:
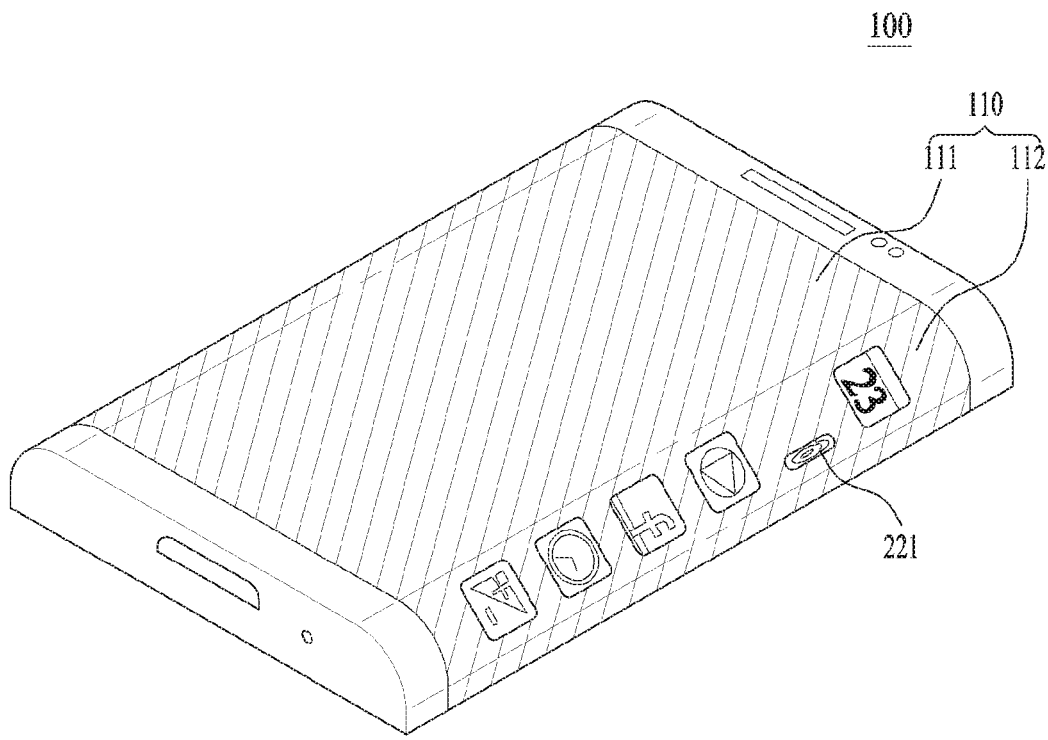

FIGS. 5 and 6 are diagrams illustrating a first input for transforming an icon to an image of a switch form and an image of a switch form according to one embodiment of the present specification.

First of all, referring to FIG. 5, it is able to see that a user inputs a first input for transforming an icon 220 corresponding to a camera application into a switch form. In the present specification, the first input corresponds to an input for transforming an icon of an application displayed on the sub-region 112 into an image of a predetermined form.

According to one embodiment of the present specification, as shown in an example of FIG. 5, the first input may correspond to an input for moving an icon of an application in a direction away from the main region 111 in while a user maintains a contact on the icon of the application. Of course, the first input can be inputted in various ways except the example shown in FIG. 5. The control unit 120 transforms the icon into an image of a predetermined form via the first input of the user and can display the image on the sub-region 112.

According to one embodiment of the present specification, the image of the predetermined form may correspond to an image of a switch form. Of course, the image may correspond to an image of various forms rather than the switch form.

Referring to FIG. 6, it is able to see that the image of the switch form is displayed on the sub-region 112 by the first input. The image 221 of the switch form corresponds to an image transformed from the icon 220 corresponding to the camera application shown in FIG. 5 by the first input.

According to one embodiment of the present specification, the image may have a size smaller than the icon of the application.

And, according to one embodiment of the present specification, the image can be displayed on a position corresponding to the side of the device 100 among the sub-region 112.

And, according to one embodiment of the present specification, the image can include an identifier capable of identifying the application.

Figure 7:
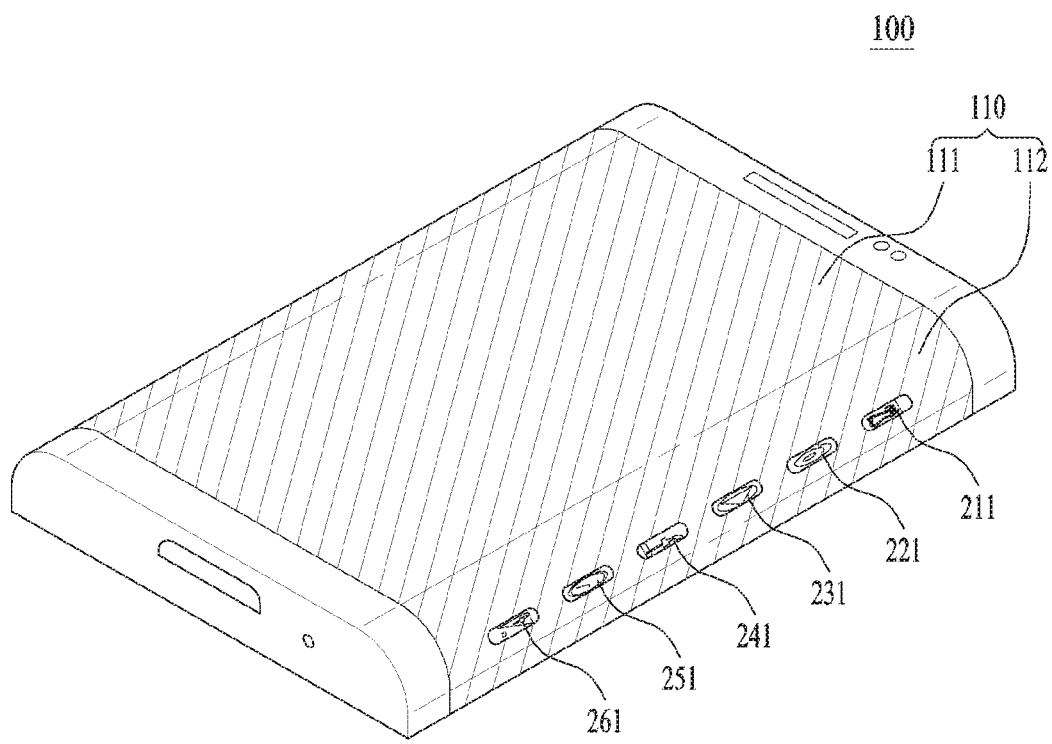
FIG. 7 is a diagram illustrating an example that all icons displayed on a sub-region are transformed into images of a switch form according to one embodiment of the present specification.

FIG. 7 is a diagram illustrating an example that all icons displayed on a sub-region are transformed into images of a switch form according to one embodiment of the present specification.

Referring to FIG. 7, it is able to see that icons are transformed into a plurality of images of a switch form. A plurality of the images are transformed from the icons 200 shown in FIG. 4. As shown in FIG. 7, if a plurality of the images are displayed on the sub-region 112, it may be difficult to identify which image is transformed from an icon of an application. Hence, if an image includes an identifier capable of identifying an application, it may solve the aforementioned ambiguity problem. The identifier can be simply represented by a number of a letter. As shown in FIG. 7, the identifier can be configured by reducing a shape of an original icon. Meanwhile, it is apparent that the identifier may vary depending on a size of the image.

According to the present specification, when a second input of a user is received on the image via the bended display 110, the control unit 120 can control a function corresponding to the second input to be performed among functions of the application.

Figure 8:
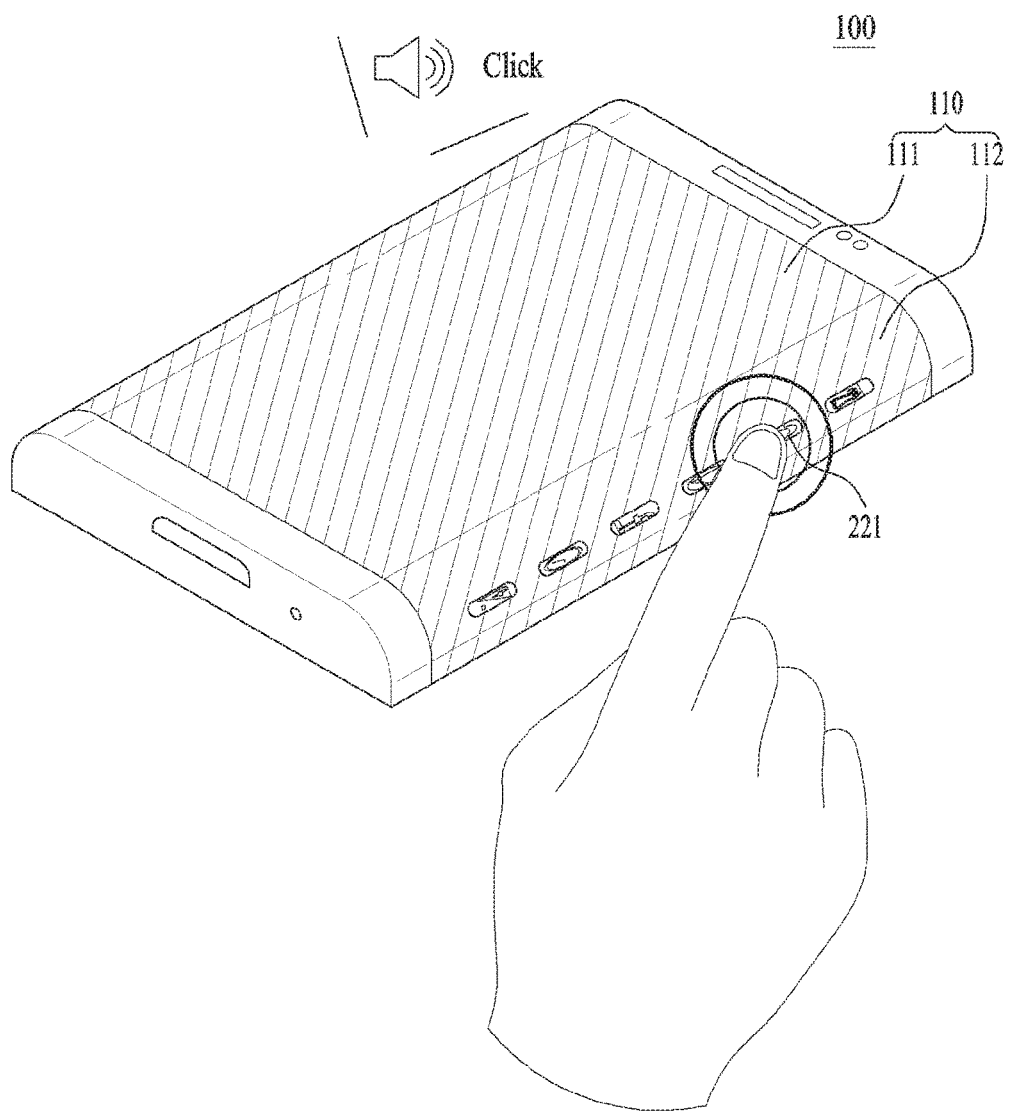
FIG. 8 is a diagram illustrating a second input for performing a picture capturing function corresponding to a function of a camera application according to one embodiment of the present specification.

FIG. 8 is a diagram illustrating a second input for performing a picture capturing function corresponding to a function of a camera application according to one embodiment of the present specification.

Referring to FIG. 8, it is able to see that a user touches an image among images of a switch form. An input of the user corresponds to a second input. The second input corresponds to an input for performing a function among functions of the application. The second input may correspond to at least one selected from the group consisting of a touch input, a double touch input, and an input for maintaining a touch for more than prescribed time.

As an example, as shown in FIG. 8, if a user touches an image 221 transformed from an icon of a camera application, a picture capturing function can be performed. And, if the user maintains a touch touched on the image 221 for prescribed time, a video capturing function can be performed.

As a different example, if the user touches an image transformed from an icon of a voice recording application, it may start voice recording. And, if the user touches the image again, it may terminate the voice recording. If the user maintains a touch touched on the image transformed from the icon of the voice recording application, it may perform voice recording only when the touch is maintained.

As a further different example, if the user touches an image transformed from an icon of a music playing application, it may play music. And, if the user touches the image again, it may stop playing music.

As a further different example, if the user touches an image transformed from an icon of an SNS application, it may perform a function of uploading current location information to an account of the user using a GPS sensor. The aforementioned examples correspond to exemplary description according to functions of several representative applications, by which the present specification may be non-limited.

Meanwhile, an image of a switch form may have a push button switch form, a tact switch form, a toggle switch form, or a slide switch form.

A push button switch corresponds to a switch for changing ON/OFF state whenever a button is pushed. In particular, if a button is pushed one time to enter ON state, the ON state is continuously maintained until the switch is pushed again. Hence, if a function of an application corresponds to a function of changing ON/OFF state, the image may become an image of the push button switch form.

A tact switch corresponds to a switch for maintaining ON state only when a button is pushed. In particular, if a user releases a hand from a button, the switch is switched to OFF state while returning to the original state. Hence, if a function of an application corresponds to a function of maintaining ON state only when a button is pushed, the image may become an image of the tact switch form.

A toggle switch corresponds to a switch capable of changing ON/OFF state by moving a lever. Hence, if a function of an application corresponds to a function of changing ON/OFF state, the image may become an image of the toggle switch form.

A slide switch is similar to the toggle switch. Yet, the slide switch uses a sliding button. A state can be changed according to a position to which a handle of the switch is slid. Hence, if a function of an application corresponds to a function of changing at least 3 states, the image may become an image of the slide switch form.

The aforementioned examples are just an example of a switch form of the image. It is apparent that the image can have various forms.

Meanwhile, according to the present specification, the control unit 120 can display an interface capable of configuring a function of the application corresponding to the second input on the main region 111. Although the function of the application corresponding to the second input can be configured in advance by a manufacturer of the application, a user can configure the function of the application corresponding to the second input by a function preferred by the user via the interface.

Meanwhile, according to one embodiment of the present specification, when a function of an application corresponding to the image operates, the control unit 120 can display a graphic effect on the image to indicate that the application is in an active state. A user can easily recognize whether or not the function of the application is in the active state via the graphic effect. In this case, the graphic effect may correspond to a graphic effect related to a function corresponding to the second input. For example, assume that the user plays music by touching an image transformed from an icon of a music playing application. In this case, such a graphic effect as '▲' can be displayed on the image as a graphic effect to indicate that music is playing. If the user touches the images again to stop playing music, such a graphic effect as '■' can be displayed on the image. The aforementioned example is just an example only. The graphic effect may vary depending on a characteristic of an application or a function of an application.

Meanwhile, according to one embodiment of the present specification, when a function corresponding to the second input is performed, the control unit 120 may not display a screen of the application on the main region 111. In general, if an application is executed, a screen of the application is displayed on the main region 111. Yet, according to one embodiment of the present specification, although the second input is received, the control unit 120 may not display the screen of the application on the main region 111. As shown in FIG. 8, when a user inputs a second input on an image 221 to capture a picture, a sound of capturing a picture (e.g., click) is outputted via a speaker only to make the user recognize that a picture capturing function has been performed in response to the second input.

Figure 9:
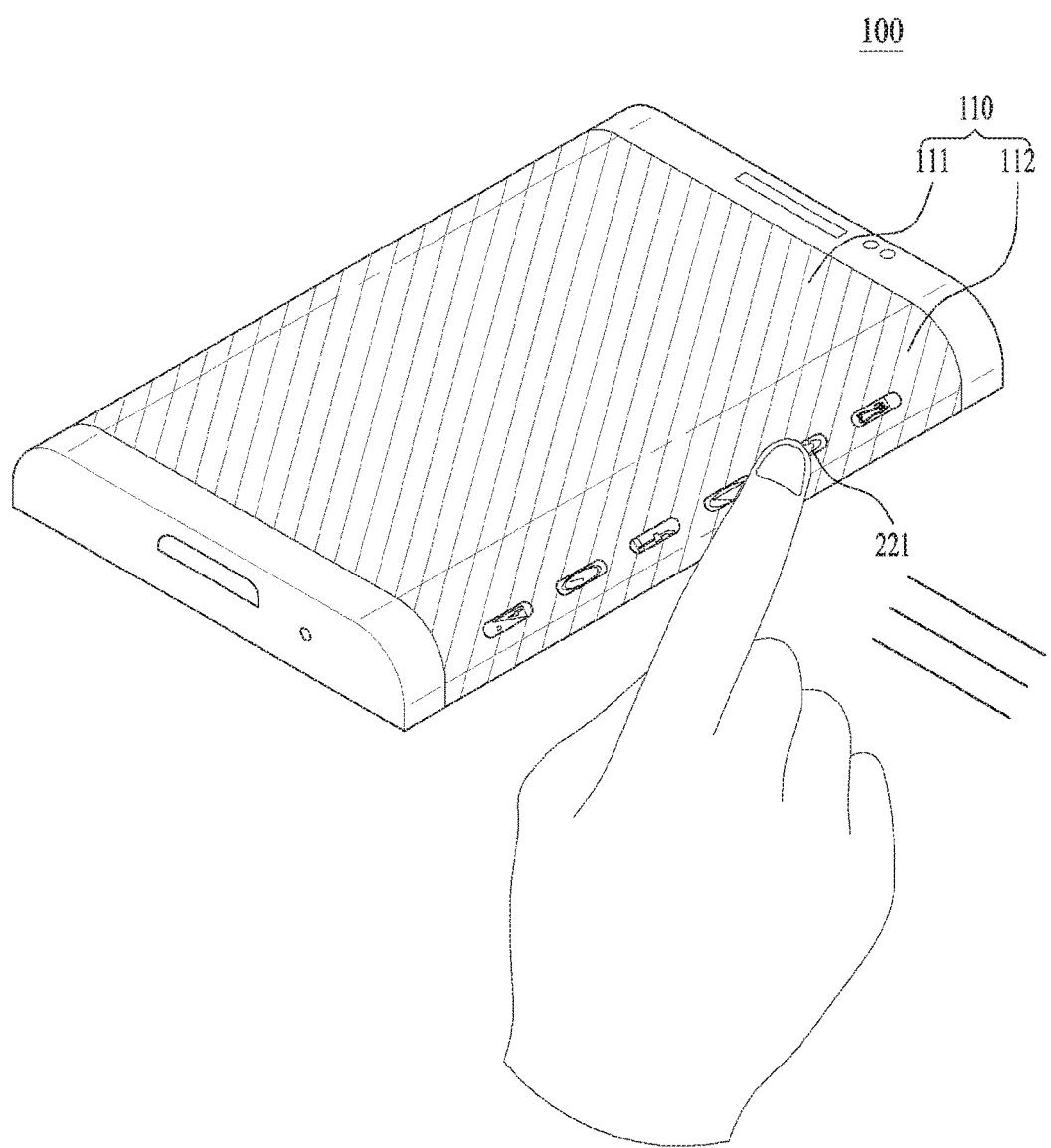
FIGS. 9 and 10 are diagrams illustrating an example that an image is retransformed into an icon via a third input.
Figure 10:
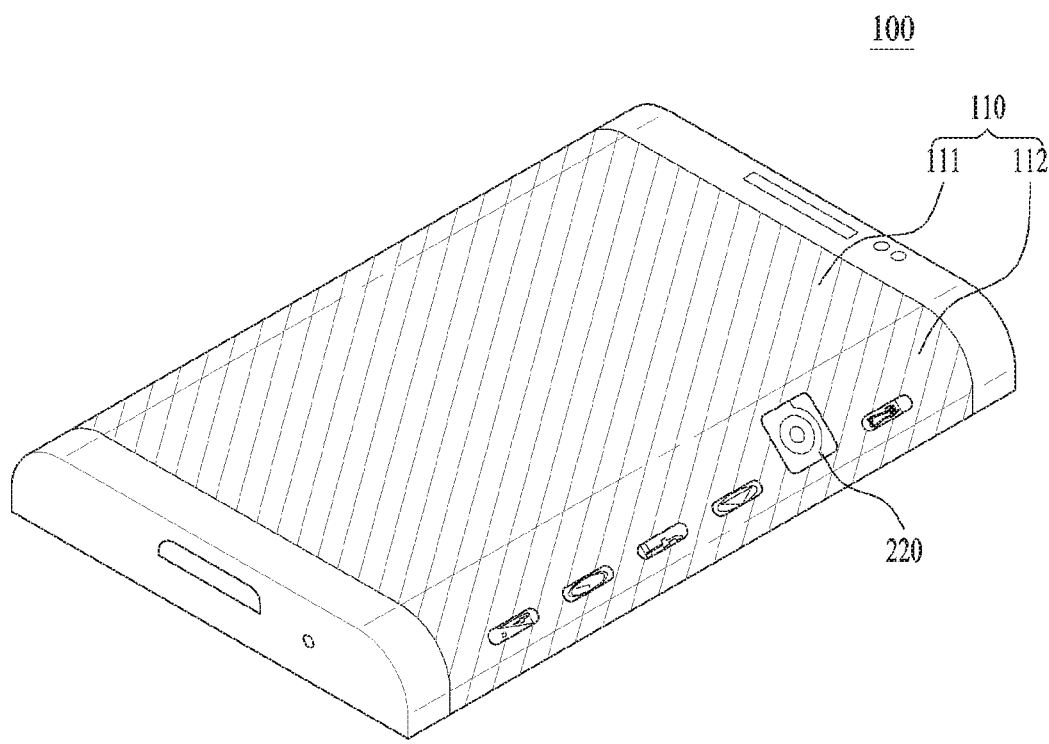

FIGS. 9 and 10 are diagrams illustrating an example that an image is retransformed into an icon via a third input.

According to one embodiment of the present specification, when a third input of a user is received on the button image via the bended display 110, the control unit 120 can retransform the image into an icon of the application and display the icon on the sub-region 112.

According to one embodiment, as shown in FIG. 9, the third input may correspond to an input for moving the button image in a direction adjacent to the main region while a user maintains a contact on the button image. Referring to FIG. 10, it is able to see that the image 221 is retransformed into the icon 220 via the third input.

In the following, a method of controlling a bended display device is explained according to the present specification. In explaining the method of controlling the bended display device, explanation on the configurations of the bended display device 100 is omitted for clarity.

Figure 11:
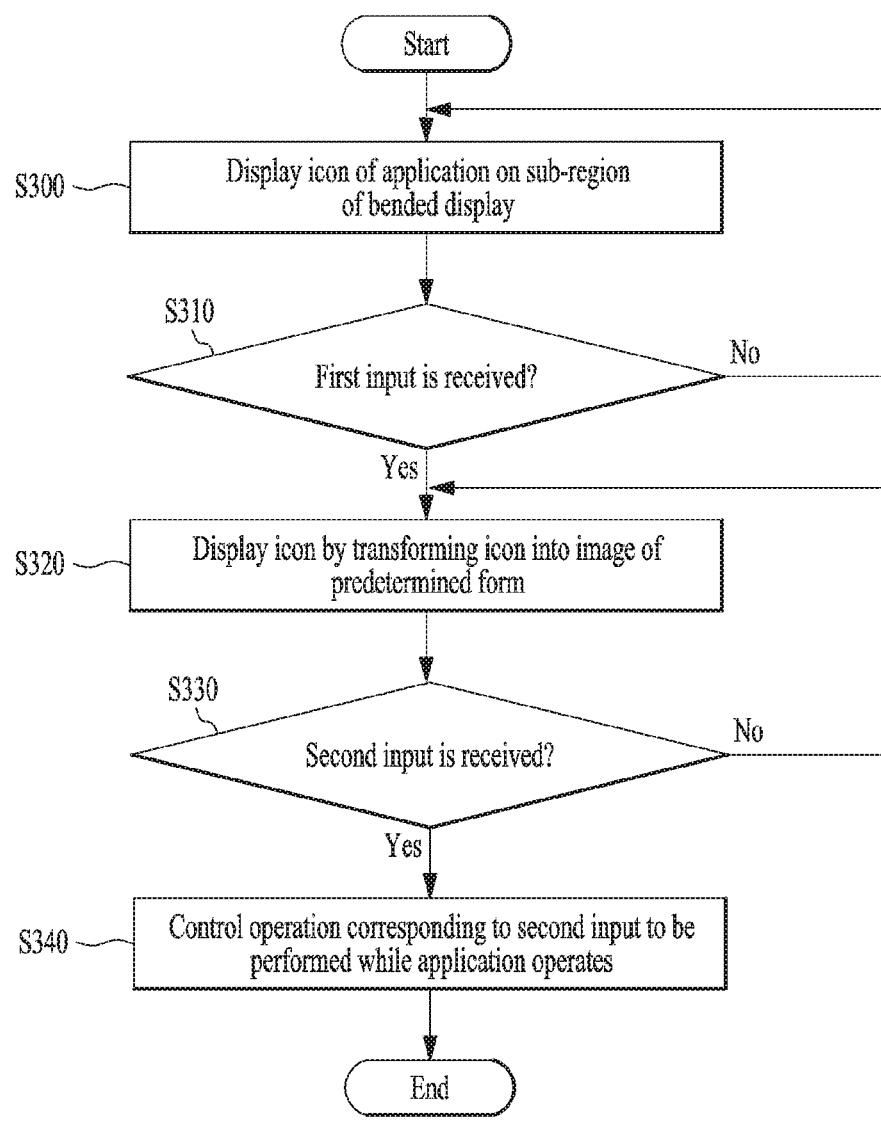
FIG. 11 is a schematic flowchart for a method of controlling a bended display device according to one embodiment of the present specification.

FIG. 11 is a schematic flowchart for a method of controlling a bended display device according to one embodiment of the present specification.

Referring to FIG. 11, the control unit 120 displays an icon of an application on the sub-region 112 of the bended display 110 [S300]. Since the step S300 has already been explained with reference to FIG. 4, overlapped explanation is omitted at this time. The control unit 120 moves to the step S310 from the step S300.

The control unit 120 determines whether or not a first input is received [S310]. Since the first input has already been explained in detail, overlapped explanation is omitted at this time. If the first input is not received ('no' in the step S310), the control unit 120 moves to the step S300. Hence, the control unit repeatedly performs the steps S300 and S310. On the contrary, if the first input is received ('yes' in the step S310), the control unit moves to the step S320.

According to one embodiment of the present specification, the first input corresponds to an input for moving the icon of the application in a direction away from the main region 111 while a user maintains the touch on the icon of the application. Since the first input has already been explained in detail with reference to FIG. 5, overlapped explanation is omitted at this time.

The control unit 120 transforms the icon into an image of a predetermined form and displays the image on the sub-region 112 [S320]. Since the step S320 has already been explained with reference to FIGS. 6 and 7, overlapped explanation is omitted at this time. The control unit moves to the step S330 from the step S320.

The control unit 120 determines whether or not a second input is received [S330]. Since the second input has already been explained in detail, overlapped explanation is omitted at this time. If the second input is not received ('no' in the step S330), the control unit 120 moves to the step S320. Hence, the control unit 120 repeatedly performs the steps S320 and S330. On the contrary, if the second input is received ('yes' in the step S330), the control unit 120 moves to the step S340.

The control unit 120 controls a function corresponding to the second input among functions of the application to be performed [S340]. Since the step S340 has already been explained with reference to FIG. 8, overlapped explanation is omitted at this time. The control unit 120 ends the processing.

Figure 12:
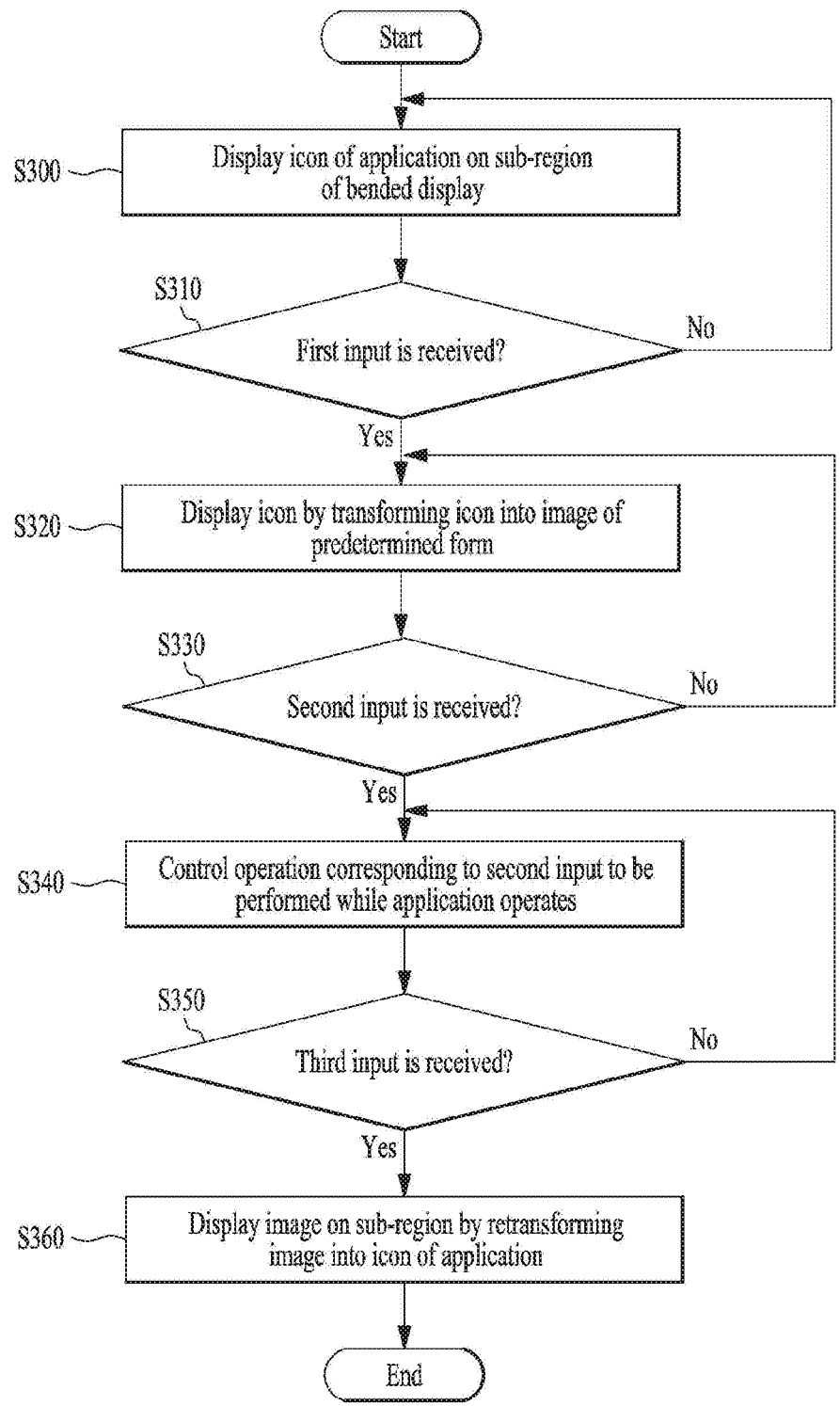
FIG. 12 is a schematic flowchart for a method of controlling a bended display device according to a different embodiment of the present specification.

FIG. 12 is a schematic flowchart for a method of controlling a bended display device according to a different embodiment of the present specification.

Referring to FIG. 12, it is able to see that the steps S330 to 340 are identical to the embodiments shown in FIG. 11. Hence, the steps S350 and S360 are additionally explained only.

After the step S340 is completed, the control unit 120 moves to the step S350.

The control unit 120 determines whether or not a third input is received [S350]. Since the step S350 has already been explained in detail, overlapped explanation is omitted at this time. If the third input is not received ('no' in the step S350), the control unit 120 moves to the step S340. Hence, the control unit 120 repeatedly performs the steps S340 and S350. On the contrary, if the third input is received ('yes' in the step S350), the control unit 120 moves to the step S360.

The control unit 120 retransforms the image into the icon of the application and displays the icon on the sub-region 112 [S360]. Since the step S360 has already been explained with reference to FIGS. 9 and 10, overlapped explanation is omitted at this time. The control unit 120 ends the processing.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Specific structural and functional description of the present specification respective to the exemplary embodiments, which are provided in accordance with the concept of the present specification disclosed in the present specification, is merely an exemplary description provided for the purpose of describing the exemplary embodiments according to the concept of the present specification. And, therefore, the exemplary embodiment of the present specification may be realized in diverse forms and structures, and, it should be understood that the present specification is not to be interpreted as being limited only to the exemplary embodiments of the present specification, which are described herein.

Since diverse variations and modifications may be applied to the exemplary embodiments according to the concept of the present specification, and, since the exemplary embodiments of the present specification may be configured in diverse forms, specific embodiment of the present specification will hereinafter be described in detail with reference to the examples presented in the accompanying drawings. However, it should be understood that the exemplary embodiments respective to the concept of the present specification will not be limited only to the specific structures disclosed herein. And, therefore, it should be understood that all variations and modifications, equivalents, and replacements, which are included in the technical scope and spirit of the present specification, are included.

In the present specification, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as ' . . . unit', ' . . . part' corresponds to a unit for processing at least one or more functions or operations. The unit can be implemented by a combination of hardware and/or software.

While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

In explaining the embodiments of the present specification, for clarity, an example of adding a single subordinate configuration is mainly explained. Yet, an embodiment of adding a combination of two or more subordinate configurations is also feasible. Hence, the scope of the present specification may be non-limited by the embodiments disclosed in the present specification.

MODE FOR INVENTION

Various embodiments have been explained in the best mode for implementing the present specification. It is apparent to those skilled in the art that various modifications and changes can be made in the present invention without deviating from the idea and the scope of the present specification. Therefore, the present specification can include variations and changes provided within the range and a similar range of the attached claims.

INDUSTRIAL APPLICABILITY

As mentioned in the foregoing description, all or a part of the present specification can be applied to electronic devices.

What is claimed is:

1. A bended display device, the device comprising: a bended display containing a main region located on a front side of the device and a sub-region extended from the main region and having a prescribed curvature; and
   a control unit configured to: control a function of the device;
   when a first touch input is received on an icon of an application displayed on the sub-region, transform the icon into a button image such that the button image is displayed instead of the icon on the sub-region, wherein the first touch input comprises dragging the icon in a first direction away from the main region, wherein the button image has a switch form, and wherein the button image has a size smaller than a size of the icon of the application;
   when a second touch input is received on the button image execute a function corresponding to the second touch input among a plurality of functions of the application; and
   when a third touch input is received on the button image, re-transform the button image into the icon of the application such that the icon is displayed instead of the button image on the sub-region, wherein the third touch input comprises dragging the button image in a second direction toward the main region.

2. The device of claim 1, wherein when a touch input of the user is received on the icon of the application displayed on the sub-region, the control unit is further configured to execute the application and cause the bended display to display a screen of the executed application on the main region.

3. The device of claim 1, wherein the button image is displayed at a position of the sub-region corresponding to a side of the device.

4. The device of claim 1, wherein the button image comprises an identifier identifying the application.

5. The device of claim 1, wherein the second touch input corresponds to at least one of a single touch input, a double touch input, or a long touch input for maintaining a touch for prescribed time.

6. The device of claim 1, wherein the control unit is further configured to cause the bended display to display an interface capable of configuring the function of the application corresponding to the second touch input on the main region.

7. The device of claim 1, wherein the control unit is further configured to cause the bended display to display a graphic effect on the button image to indicate that the application is in an active state when the function of the application corresponding to the button image is executed.

8. The device of claim 7, wherein the graphic effect corresponds to a graphic effect related to the function corresponding to the second touch input.

9. The device of claim 1, wherein the control unit is further configured not to display a screen of the application on the main region when the function corresponding to the second touch input is executed.

10. A method of controlling a bended display device, which comprises a bended display containing a main region located on a front side of the device and a sub-region extended from the main region and having a prescribed curvature, the method comprising:

when a first touch input is received on an icon of an application displayed on the sub-region, transforming the icon into a button image such that the button image is displayed instead of the icon on the sub-region, wherein the first touch input comprises dragging the icon in a first direction away from the main region, wherein the button image has a switch form, and wherein the button image has a size smaller than a size of the icon of the application;

when a second touch input is received on the button image executing a function corresponding to the second touch input among a plurality of functions of the application; and when a third touch input is received on the button image, re-transforming the button image into the icon of the application such that the icon is displayed instead of the button image on the sub-region, wherein the third touch input comprises dragging the button image in a second direction toward the main region.

11. The method of claim 10, further comprising displaying a graphic effect on the button image to indicate that the application is in an active state when the function of the application corresponding to the button image is executed.

* * * * *